April 23, 1935.  O. W. LEE  1,999,054
OPHTHALMIC TEST MEDIA AND METHOD OF PREPARING SAME
Filed Oct. 4, 1933  2 Sheets-Sheet 1
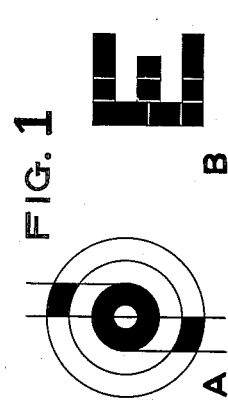
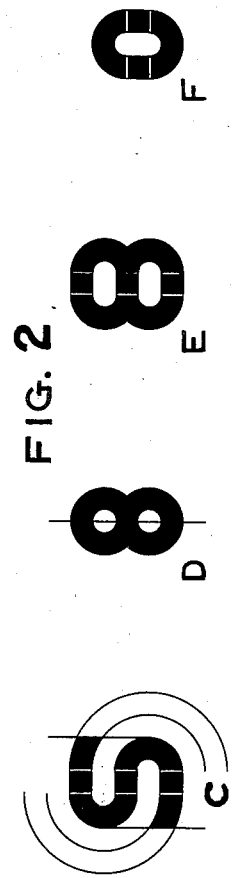
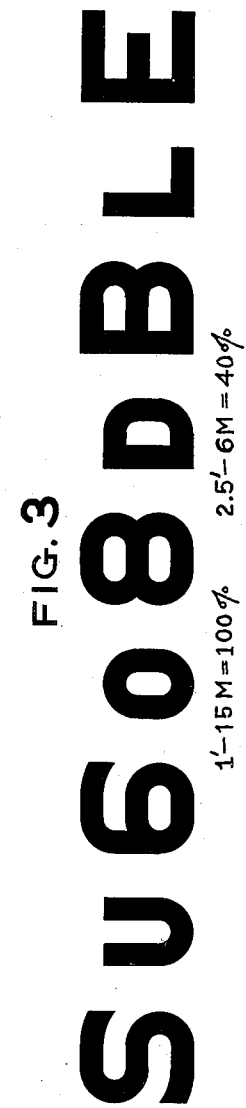
Orval W. Lee
INVENTOR
BY Herbert E. Smith
ATTORNEY April 23, 1935.    O. W. LEE    1,999,054
OPHTHALMIC TEST MEDIA AND METHOD OF PREPARING SAME
Filed Oct. 4, 1933    2 Sheets-Sheet 2
FIG. 4
U O D L
FIG. 5
B O 8 D F 6
FIG. 6
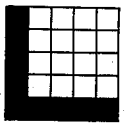 E U B D S
Orval W. Lee
INVENTOR
BY Herbert E. Smith
ATTORNEY Patented Apr. 23, 1935

1,999,054

UNITED STATES PATENT OFFICE 1,999,054

OPHTHALMIC TEST-MEDIA AND METHOD OF PREPARING SAME

Orval W. Lee, Spokane, Wash.

Application October 4, 1933, Serial No. 692,107

10 Claims. (Cl. 88—20)

My present invention relates to improvements in ophthalmic test-media and method of preparing same. According to my improved method, the visual acuity characters or symbols employed are constructed or formulated to produce a uniform visibility in the several characters in each group or series. This uniform visibility in each serial group of test-media is attained by constructing or forming the symbol, as a letter, numeral or other suitable character, from segments or parts of the same geometrical figures and means for determining percentage variations of visual acuity are provided by several percentage graduations of the visual acuity characters.

By the utilization of certain geometrical designs, as circles and rectangles, I produce a number of letters, numerals and other characters having a uniform size of detail parts subtending definite angular dimensions. Due to this uniformity of detail dimensions, these various visual acuity characters have a uniform visibility. By classifying the characters as to their detail structure I determine the angular dimensions of the area each character should occupy. By a novel process of construction I produce equal detail dimensions in characters occupying areas of different dimensions. My method and process of construction embodies a well defined standard of angular dimensions of detail, such standard having a restricted latitude. By the utilization of this standard I produce a number of different, normal visual acuity characters having a close resemblance to each other and a uniform visibility. Due to this close resemblance and uniform visibility these characters cannot be correctly named by a patient unless they are distinctly seen by such patient. These visual acuity characters are provided in several sets, selections, or groups of several graduated sizes of angular dimensions of detail, each group being properly labeled as to angular dimensions of detail at specified distances and as to percentage of visual acuity represented at those distances. In this manner I provide a more accurate and correct means of determining and designating the vision of the human eye than can be attained by use of the visual acuity characters which have long been in general use. These visual acuity characters and their visual valuation are a complete measure of visual acuity, and by their use any skilled person can quickly and accurately determine the vision of the human eye without difficulty and correct errors of refraction with exactitude and precision.

By the utilization of the method and characters of my invention I eliminate numerous inaccuracies and disadvantages that impair the efficiency of the test-media now in general use and I thereby enhance the value of subjective refraction. I provide a more definitely defined standard than has heretofore been used for measuring the vision of the human eye and such standard possesses a more uniform visibility than do the characters now in general use. A further result attained by my invention is the establishment of a minimum variation in the angular dimensions and proportions of the component parts of all visual acuity characters employed, which results in a minimum variation in visibility; and finally I provide a well defined standard for the angular dimensions and proportions of the constituent parts of all visual acuity characters employed, irrespective of the dimensions of the entire character.

Preferably I use various graduated sizes of the characters, in related groups, each group containing a number of equally visible characters and each group being separately presented to the monocular view of the person being examined.

My invention consists in certain novel constructions or formations of symbols, comprising letters, numerals and other characters derived from certain geometrical figures and in the use of these characters in determining visual acuity and errors of refraction and in the correction of anomalies of the refraction of the human eye. In the accompanying drawings I have illustrated several examples of the physical embodiment of my invention, but it will be understood that these characters, or others of like nature, may be arranged in any order or sequence, and the characters may be of any size suitable for the purpose intended, which size is governed by the geometrical angle of one minute at different designated distances.

It will also be understood that I may provide these characters in any manner or in any material appropriate for the purpose intended, as for instance, opaque characters may be formed upon either a translucent surface or upon an opaque surface; and I may employ any color combination suitable to ophthalmic purposes. The characters may be of as many different graduations as desired and they may be arranged in any order, sequence, or grouping. The characters may be etched, engraved, or pressed into the surface of any appropriate material by any convenient method and the impression in the material filled with any suitable substance of any suitable color combination; or I may provide the characters in the nature of either colored or uncolored transparencies to be employed by projecting them upon a suitable screen for display.

In Figure 1, I show the geometrical figures from which the test-media are constructed; Diagram A indicating arcuate segments of concentric circles and Diagram B indicating rectangular segments; the two forms of segments being employed in the formation of the symbols, as letters, numerals, and other characters.

Figure 2 shows in a diagrammatic manner at C the formation of the letter S from arcuate and rectangular segments; Diagram D shows an intermediate step in the formation of the numeral 8 where arcuate segments only are used; Diagram E shows the formation of the numeral 8 from arcuate and rectangular segments, the latter forming a vertical arrangement; and Diagram F shows the letter O formed of arcuate and rectangular segments with the latter horizontally spaced.

Figure 3 illustrates a group of visual acuity characters or symbols produced from segments and sections of the diagrams in Figure 1; and shows symbols or characters occupying areas of two different sizes and having similar dimensions of detail parts and uniform visibility.

Figure 4 illustrates the increased visibility which results when the small characters in Figure 3 occupy the same size area as the large characters in Figure 3.

Figures 5 and 6 are utilized for the purpose of illustrating symbols now used in general practice, having dimensions subtending angles of five minutes width and five minutes height, which symbols are found to be inaccurate and unsatisfactory for use as visual acuity test-media.

As will be seen in Figure 1, the segments of which the symbols or characters are formed are of predetermined sizes and shapes, the arcuate segments being fashioned on concentric circles, and the rectangular segments taking the shapes of squares and oblongs.

In ophthalmic practice the visual acuity characters are measured by the angle subtended by the linear dimensions; therefore, to make the description comprehensive to persons skilled in such practice, the term angular dimension will be used to designate a linear dimension subtending a specified geometrical angle and it will of course be understood that an angle of one minute refers to one sixtieth of one degree of a circle. The term detail, or geometrical detail, will be used to describe the constituent parts of characters, such as the body and interspaces; the term body being used to describe essential projections or intersecting parts and the term interspace being used to describe the separation between the projections or intersections. The term visual acuity refers to the quality of human vision; objective refraction refers to refractive errors determined without response from the patient and subjective refraction refers to refractive errors determined by responses from the patient. All of these terms are conventional in ophthalmic practice.

It is the general practice to determine the refractive condition of the human eye by employing various objective means such as the retinoscope, ophthalmoscope, ophthalmometer and other instruments; supplemented by subjective refraction with dioptric media and visual acuity characters. Objective refraction although definite is inapplicable until compensated to the visual requirements of the patient by the complementary technic of subjective refraction. The correctness of subjective refraction is largely dependent upon the accuracy of the visual acuity characters employed in the examination. The refractive condition can be determined by several methods, but the only possible method of determining the seeing qualities of the eye is to demonstrate what the eye can actually see. For this latter purpose it is essentially necessary that the test-media employed to determine the visual acuity should conform to a well defined standard; otherwise such test-media would not provide definite information as to the seeing qualities of the eye undergoing examination and the subjective refraction conducted by the use of such characters would be unreliable and inaccurate.

The visual acuity characters which are at present in general use throughout the civilized world, consist of characters subtending an angle of five minutes in width and height, each stroke of the letter subtending an angle of one minute in width and unavoidably there is considerable variation in the width and length of interspaces and also considerable variation in the length of projecting parts. Such characters provide a convenient and readily applied test, but possess certain inherent inaccuracies which are generally acknowledged by recognized authorities. Previous to my invention all of the numerous attempts to correct the well known inconsistencies of such characters have proven futile. Other means such as crossed line gratings may be used to determine visual acuity and these gratings are indeed accurate; but unfortunately in practice the examiner is dependent upon the accuracy of the patient to state when he sees the lines distinctly. Another method consists of projecting characters upon a screen, increasing or decreasing the size of the character until the patient declares the character to be distinctly seen, or too small to be seen as the case may be. Unfortunately this method also makes the examiner dependent upon the accuracy and responsibility of the patient to respond correctly and also dependent upon the accuracy of the characters employed.

The visual acuity characters of my invention eliminate the disadvantages inherent to the three methods just mentioned and thereby enhance the value of subjective refraction.

Preferably, I use various graduated sizes of the characters illustrated in Figure 3, associated with others of like nature. The characters in Figure 3 are so nearly equal in visibility and the larger characters bear such a close resemblance to each other that slight indistinctness will make them incapable of recognition and any flattering attempt to name the characters when they are not distinctly seen will result in misnaming them.

The characters are displayed at a designated distance, say six meters, each graduated selection being separately presented, in succession according to decreasing visibility, and each selection containing a different sequence of characters. In this manner each presentation represents a certain percentage of visual acuity, no unrelated characters are visible and the variety of characters and of sequences is sufficient to preclude memorizing by the person undergoing examination. Such person is directed to separately name each character as each of the graduated selections are presented in decreasing succession. The seeing ability of each eye is manifested by the person's ability to correctly name each character, independent of the opinion of the person being examined. Pretenders disqualify themselves by misnaming the characters and malingerers can easily be detected by various methods that are well known.

I determine the visual acuity of each eye by mathematically computing the relationship existing between the geometrical angle subtended by the smallest detail correctly recognized and the geometrical angle subtended by the detail of a character which is normally visible. For this purpose I use the formula $$V = \frac{AV}{AR}$$

or $$V = AV \div AR = PV;$$

in which V represents visual acuity; AV, normal angle of visibility or one minute; AR, angle of recognition of the eye examined; and PV, percentage of normal visual acuity.

I also employ these characters in conjunction with dioptic media or test-lenses to determine the subjective refraction of each eye and thereby ascertain the extent to which the objective refraction is applicable to the visual requirements of the patient. Accurate results can be attained by the method described and the examiner may rely upon the diagnostic omens with a sense of security. The superiority of this method is due entirely to the visual acuity characters of my invention and the novel method of producing such characters according to a well defined standard as herein set forth.

In carrying out my invention I construct each visual acuity character from the geometrical designs illustrated in Figure 1, by combining parts of these geometrical designs in the manner illustrated in Figure 2. I use the simplest form of unspurred letters and numerals of unexaggerated proportions and synonymous construction as they are least likely to confuse a patient. The width of the component parts of each normal visual acuity character, both body and interspace, are made to subtend an angle of one minute at the designated distance, as any variation of this essential requirement alters visibility.

The body and the interspaces of the geometrical designs A and B in Figure 1 subtend an angle of one minute at a distance of fifteen meters and therefore, any letter or numeral formed by combining various parts of said designs, will possess this same required characteristic and the various characters will be of synonymous construction. (In the printed patent all drawings appear two-thirds actual size.)

To construct the letter S, I bisect Diagram A on the vertical diameter and laterally separate the two halves by interposing the three one-minute squares comprising the second section of Diagram B, in the manner illustrated in Diagram C. It will be apparent that the letter S thus formed is geometrically correct in all of its parts and obviously the body and interspaces each subtend an angle of one minute width.

To construct the numeral 8, I superimpose the three-minute center of Diagram A on another three-minute center overlapping them one minute in the manner illustrated in Diagram D. I bisect Diagram D vertically, as indicated by the line, laterally separate the two halves and interpose the three one-minute squares comprising the second section of Diagram B, to form the numeral 8 as shown in Diagram E. The similarity in constructing the letter S of Diagram C and the numeral 8 of Diagram E is apparent.

To construct the letter B shown in Figure 3, I unite the right half of Diagram E of Figure 2 with the left half of Diagram B of Figure 1.

Other letters, numerals and characters are constructed by similar method or process, using segments of the concentric circles illustrated in Diagram A, united with various sections of the letter E illustrated in Diagram B; thus assuring the required one minute width of body and interspace, synonymous construction, uniformity of design and uniform visibility.

Obviously, all characters constructed by the method just described will subtend an angle of five minutes vertically and four minutes horizontally at a distance of fifteen meters.

It will be apparent that when certain letters as for instance U, O and D in Figure 4, occupy an area subtending an angle of five minutes vertically and four minutes horizontally, such letters possess an interspace two minutes in width and therefore are more readily visible than the characters in Figure 3 that have interspaces one minute in width. It will also be apparent that when certain letters as for instance U and L in Figure 4, occupy an area four minutes wide and five minutes high, such letters have projecting parts subtending an angle of four minutes maximum length and three minutes minimum length, and of course the larger detail of such letters renders them more easily visible than any of the characters illustrated in Figure 3, irrespective of the fact that the large characters in Figure 3 occupy the same size area as the letters in Figure 4.

It will be seen that each of the large characters S, 6, 8, B and E in Figure 3 has two horizontal interspaces separated by a central bar; and that in contradistinction, the letters in Figure 4 have a single vertical interspace which of course precludes the presence of a central bar.

The absence or presence of a central bar materially alters the geometrical detail of a character and obviously such variation of detail alters visibility. Characters without a central bar have a greater visibility than characters of the same size having a central bar, due to the fact that the interspace of the former is much larger than the interspaces of the latter and also due to the fact that the projecting parts of the former are longer than those of the latter.

As seen in Figure 3, the letters U, O, and D having a single vertical interspace and devoid of a central bar, may be made equal in visibility to letters having two horizontal interspaces separated by a central bar, by constructing the former with the same size detail as the latter. To accomplish this equal visibility I construct the letters U, O and D illustrated in Figure 3, by uniting segments of the three-minute center of diagram A with sections of Diagram B.

To construct the letter O of Figure 3; I bisect the three-minute center of Diagram A, and separate the two semicircles or arcuate segments vertically, by interposing two of the one-minute squares of Diagram B between these segments as indicated in Diagram F. I construct U by uniting a three-minute semicircle from Diagram A with parts of Diagram B; and it will be apparent that the letter D of Figure 3 is constructed of two quadrants of the aforementioned three-minute circle separated vertically by a one-minute square and united with parts of Diagram B.

It will be seen that the method used in constructing the small letters in Figure 3 produces the same size detail as the large characters in Figure 3 and that when the small letters in Figure 3 are rotated to horizontal position, the letter U is comparable to the upper portion of either the letter S or the numeral 6 and the letter D is comparable to the upper or lower portion of the letter B. Therefore any person who could not distinctly see the figuration of the letters U and D in Figure 3, would be unable to distinctly see detail of the same dimensions in S, 6, and B, or in any other character. It will also be apparent that the letter O in Figure 3 is identical in detail to the upper or lower portion of the numeral 8, or the lower portion of the numeral 6. Manifestly the visibility of the unit detail of the letter O in Figure 3 is equal to the visibility of the double detail of the numeral 8 in the same figure, irrespective of the difference in the dimensions of the areas occupied by the two characters, because the dimensions of the detail of the former and the latter are the same. Any person who could not distinctly see the figuration of this letter O, would be unable to see detail of the same dimensions in the numerals 6 and 8, or in any other character.

I construct the letter L in Figure 3 so that the length of the vertical projection subtends an angle of three minutes and the length of the horizontal projection subtends an angle of two minutes and it will be apparent that this detail is of the same dimensions as the projecting parts of the letter E in Figure 3 and manifestly the letter L having angular dimensions of three minutes width and four minutes height is not less visible than the letter E having angular dimensions of four minutes width and five minutes height, irrespective of the difference in the dimensions of the areas occupied by the two characters, because the dimensions of the detail of the former and the latter are the same. Any person who could not distinctly see the figuration of this letter L, would be unable to see detail of the same dimensions in the letter E, or any other character.

It will be apparent that the small letters illustrated in Figure 3 would be more easily visible than the large characters in Figure 3 were the former made to occupy the same size area as the latter and obviously the former would then represent less than normal visual acuity at the designated distance at which the latter represented normal visual acuity. The small letters in Figure 3 are the same letters as are illustrated in Figure 4 and it will be apparent that the area occupied by each of the large characters in Figure 3 is identical in size to the area occupied by the letters in Figure 4; and likewise it will be apparent that this equality of size does not result in equal visibility. Equality of angular dimensions of detail parts does result in equal visibility and irrespective of the difference in size of the large and small characters in Figure 3, all characters in Figure 3 are equally visible because they have equal dimensions of the detail parts.

The larger characters seen in Figure 3 so closely resemble each other that faulty visual perception is certain to result in inability to differentiate and correctly name each character. Manifestly, this close resemblance makes it difficult for a patient to guess or memorize when naming these characters.

As was previously observed, the large characters in Figure 3 each subtend an angle of four minutes in width and five minutes in height and it will be obvious that when spurs one-minute square are added to the letter B seen in Figure 3, that the letter B will then have dimensions subtending an angle of five minutes in width and in height; which is the usual custom for ophthalmic purposes. As seen in Figure 5 such spurs when added do not add to the visibility of the letter B, for the reason that such extraneous projections do not enlarge the detail of the letter. Thus it will be apparent that the plain or unspurred letter B (Figure 3) having angular dimensions of four minutes wide and five minutes high according to the standard of my invention and a spurred letter B (Figure 5) having angular dimensions of five minutes width and height, each have enclosed interspaces of one minute width and two minutes length and are therefore equally visible.

The conventional use for ophthalmic purposes, of a spurred letter B having angular dimensions of five minutes width and height, furnishes proof that either the spurred letter B having angular dimensions of five minutes height and width or the unspurred letter B having angular dimensions of four minutes width and five minutes height according to the standard of my invention, are both discernable by a person having normal vision.

The spurred letter B, having angular dimensions of five minutes width and five minutes height, is very appropriate as ophthalmic test-media and such spurred letter B is generally used to valuate other visual acuity characters.

When various letters and numerals occupy an area subtending an angle of five minutes in width and five minutes in height, as is the general custom now in use for ophthalmic purposes, the spurred letters B and P are uniform as to size of detail, but other letters and numerals depart from this uniformity to a marked degree, as is seen in Figure 5. In Figure 5 the angular dimensions of the enclosed interspaces vary, as for instance, in the letter B the dimension is 1 x 2; in the letter O it is 3 x 3; in the numeral 8 it is 1 x 3; in the letter D it is 2 x 3; and the open interspace of the numeral 6 is 1 x 4. The projections of these characters also vary in dimensions, as in the numeral 6 the projection is 1 x 4, while in the letters B, D, and F, the dimensions of each projection is 1 x 1.

It will be seen in Figure 6 that when the unspurred letter B occupies an area subtending an angle of five minutes height and five minutes width, the enclosed interspace is longer than a similar space in the spurred letter B of Figure 5, occupying an area of the same dimension. In Figure 3 it will be seen that the enclosed interspaces of the characters 6, O, 8, D, and B are exactly the same length and width as the enclosed interspaces in the spurred letter B of Figure 5. The characters 6, O, 8, D and the unspurred letter B are also found in Figures 5 and 6 and it will be seen that in each instance the dimensions of each interspace exceed those of the spurred letter B, of Figure 5.

In Figure 6 where the unspurred characters occupy an area subtending an angle of five minutes height and width it will be seen that the projecting parts and interspaces are increased in either length or width as compared with the spurred letters of Figure 5 occupying the same size area; thereby increasing the visibility of letters that are readily visible and not reducing the excessive visibility of letters that are too readily visible. The unspurred letters in Figure 6 are more readily visible than the spurred letter B in Figure 5 and of course more readily visible than the unspurred B in Figure 3 and of course more readily visible than any of the characters in Figure 3 that have uniform dimensions of detail parts. To reduce the excessive visibility of the unspurred characters shown in Figure 6 the area occupied by each character is sometimes hatched in the manner shown in the letter L. Obviously, such hatching merely covers a fault.

It will be apparent that it is utterly impossible to attain uniform visibility equal to the spurred letter B by constructing different letters and numerals in an area subtending an angle of five minutes in width and height, and that it is equally impossible to gain uniform visibility equal to the spurred letter B by constructing all letters and numerals in equal areas of any other size. Therefore the visual acuity characters that are in general use and which subtend an angle of five minutes height and width are inaccurate and unsatisfactory for ophthalmic purposes.

Obviously, the numeral 8 and the letter O cannot be made with spurs and it will be seen in Figure 5 that the numeral 8 and a spurred letter B each occupying a space five minutes square are disproportionate and dissimilar as to size of detail. To avoid this disproportion and dissimilar size of detail I construct the visual acuity characters of my invention without spurs. As seen in Figure 3 an unspurred letter B and the numeral 8 each occupying a space four minutes in width and five minutes in height are proportionate and similar as to size of detail.

In Figure 5 where the letter O occupies a space five minutes square, as is the usual custom for ophthalmic purposes, the letter encloses a round, central interspace three minutes in diameter. Obviously this interspace is much larger than an interspace of the letter B occupying an area of the same size, and it is evident that this dissimilarity of size of detail renders the letter O more easily visible than the letter B or other characters occupying an area five minutes square and of course more easily visible than any of the characters in Figure 3. This greater visibility of O and also of certain other letters is generally acknowledged by recognized authorities.

It will be apparent that any letter, numeral or character will not possess equal visibility to the characters illustrated in Figure 3 unless the dimensions of the detail parts of such character are similar to the dimensions of the detail parts of the characters illustrated in Figure 3. Uniform visibility can be attained only by definitely regulating the width and length of each projecting part and each interspace of each character, independent of the size of the area occupied by each character. Some latitude is imperative, but such latitude must be confined to narrow restrictions to provide a standard of well defined limitations.

As will be seen in Figure 3, each interspace and each part of the body of each character are of equal width and in this instance such width subtends an angle of one minute at a distance of fifteen meters.

In carrying out my invention I construct each different size of character so that the width of each interspace and each part of the body of each character subtends an angle of one minute at a designated distance. As seen in Figure 3, the characters according to my invention, have a well defined uniformity of dimensions of detail parts, the maximum length of each interspace subtending an angle of three minutes, and the minimum length of each interspace subtending an angle of two minutes. As seen in the numeral 6 of Figure 3, the maximum interspace has an open end and the minimum interspace is completely enclosed; it will therefore be evident that the latitude of length of interspace is restricted to structural necessity, and that the standard does not embrace enclosed interspaces of three minutes length. As seen in the letter E of Figure 3, the projecting parts have a maximum length of three minutes, and a minimum length of two minutes.

Thus it will be apparent that the characters in Figure 3 constitute a well defined standard for determining visual acuity, wherein the variation between maximum and minimum length of projecting parts and of interspaces is restricted to a variation of only one minute, and also wherein the interspaces and the body of each character have an equal and invariable width of one minute, a minimum length of two minutes, and a maximum length of three minutes, and also wherein the variation between the maximum length and minimum length of projections and interspaces is restricted to structural necessities that constitute the distinguishing features of the different characters. These characters constitute a well defined standard of restricted latitude and have a minimum variation of visibility. All characters conforming to this standard will possess a reasonably uniform visibility, to insure accurate ophthalmic test-media.

The practical application and utility of the visual acuity characters illustrated in Figure 3 is evidenced by the fact that at a designated observation distance, a character having a completely surrounded interspace of one minute width and two minutes length, as for instance the letter B in Figure 3, can be recognized by a person possessing normal visual acuity. As all characters in Figure 3 are equal in visibility to the letter B in the same figure, it will be evident that my present invention provides a series of visual acuity characters having a uniform visibility not otherwise obtainable in the commonly used visual acuity characters that have dimensions of five minutes square and have no standard or specification relative to the length of detail of each character and have no classification or distinction between characters with horizontal interspaces separated by a central bar and characters with a single interspace devoid of a central bar and in which the length of detail varies from one minute to four minutes as previously shown. Visibility is dependent upon the dimensions of the detail parts of each character irrespective of the size of the area occupied by the character and it will be apparent that my present invention provides a series of visual acuity characters that have detail dimensions conforming to a well defined standard of restricted latitude and consequently such visual acuity characters constitute an accurate ophthalmic test-media of uniform visibility.

As a example of the utility of my invention, the oculist or optometrist employs the described visual acuity characters in the conventional manner, to determine the visual perception of the patient under any conditions the examiner may elect, as for instance, with, or without the assistance of lenses and at any desired observation distance.

The ability of the patient to correctly name each character having a certain size of detail, reveals a visual acuity represented by the inverse proportion of the size of the detail of the character correctly recognized at the then existing observation distance and the size of the detail that a person with normal visual acuity can recognize with the unaided eye at the same observation distance. Such visual acuity may be expressed in decimals, fractions, or percentage and of course qualified by stating any lens then before the eye examined.

For the convenience of the oculist or optometrist I provide the visual acuity characters of my invention in several graduated sizes; that is to say, different angular dimensions of the width of the detail of the character, such as 1 minute, 1.25 minutes, 1.50 minutes, 2 minutes, 2.5 minutes, 5 minutes, 10 minutes or any other fraction or multiple of the 1 minute angle at a specified distance, as for instance the commonly used observation distance of six meters. Of course each succeeding larger graduation represents a greater visibility and a lesser visual acuity than the preceding smaller graduation, when employed at the same observation distance.

Since the visual acuity characters of my invention represent a more well defined standard of visual acuity than the five-minute square characters commonly used, the margin of visibility is more well defined and therefore I provide the visual acuity characters of my invention in sizes of close variation; as for instance, sizes representing 100%, 95%, 90%, 85%, 80%, 75%, etc., of normal vision.

As will be seen in Figure 3, I designate the distance at which the width of detail parts of each character subtends an angle of one minute, which of course is the distance at which the character represents normal visual acuity and I also designate the angle subtended by the width of detail parts at a specified observation distance, as in this instance the commonly used observation distance of six meters; together with the percentage of vision represented by the character when correctly recognized at that distance.

It will be evident that a patient who cannot recognize a character having a width of detail of smaller angular dimension than 2.5 minutes, has a visual acuity of 40 per cent, the normal eye being able to recognize a width of detail two fifths of such angular dimension, namely one minute. In a like manner it will be evident that a patient who cannot recognize detail of smaller angular dimension than 1.25 minutes in width, possesses four fifths or 80% of normal visual acuity, the normal eye being able to recognize detail 80% of such angular dimension, namely one minute. It will likewise be evident that vision limited to recognizing a two-minute angular width of detail represents 50%; five minutes, 20%; ten minutes, 10%, etc.

The utility of the visual acuity characters of my invention is not limited to merely determining the vision or seeing qualities of the eye, but they may be employed in combination with dioptric media or ophthalmic test-lenses to determine the subjective refraction of the human eye and thereby provide a means and method of adapting the objective refraction to the visual requirements of the patient. The visual acuity characters of my invention provide accurate diagnostic omens by which the subjective refraction can be determined.

By the employment of the described visual acuity characters, any skilled person can accurately determine the effect that a certain lens, or a combination of lenses, has upon the vision and accommodation of the eye being examined, and the examiner may thereby determine the exact focus of the ophthalmic lenses required to afford the patient the maximum vision obtainable with comfort. In this manner the visual acuity characters can be employed to accurately determine the extent to which the diagnostic omens of objective refraction are applicable to the visual requirements of the patient, and thus enable the examiner to make such compensations as may be necessary for the welfare and comfort of the patient's eyes.

The described visual acuity characters may be used to measure the quality of vision of the human eye, either with or without lenses and when they are used in combination with ophthalmic test-lenses they provide a means and method of determining the extent to which any anomaly of the eye affects vision; the extent to which any lens or combination of lenses affects vision; and the extent to which any lens or combination of lenses affects the accommodative function of the eye; thereby providing a means and method of accurately determining the refractive assistance required to co-ordinate the refraction, accommodation and vision of the human eye. Such characters provide an accurate measure of visual deficiencies and a means of determining the extent to which visual deficiencies can be remedied by ophthalmic lenses.

The visual acuity characters of my invention can without difficulty, be employed by any skilled person and it will be apparent that since these characters conform to a well defined standard of restricted latitude, that more accurate and dependable results may be attained by their use than by the use of the generally used visual acuity characters that occupy an area five-minutes square and that are of various visibilities.

It is preferable and of advantage to arrange each percentage graduation of the visual acuity characters in the least euphonious sequence possible, using not more than six characters in each group of the smaller graduations, and less in each group of the larger graduations. I prefer to use the characters having the dimensions of four minutes height and three minutes width for the larger graduations, such as 30%, 20%, and 10%, for the reason that they occupy less area and thereby aid in reducing the uniform size of the plates or plaques upon which the characters are displayed.

It is desirable to have only one graduation and only one size of characters on each plate or plaque and it is preferable to employ a display device adapted to separately present each percentage graduation. Where the characters are displayed by reflection from a single mirror, of course it is necessary to provide reverse characters.

For the examination of deaf-mutes, small children, illiterates, foreigners and others who are unable to name letters and numbers, it is convenient to use a series of nameless characters consisting of geometrical figures conforming to the standard of my invention. Such characters are designated by directing the hand up, down, left, or right, to indicate the position of the open end of the interspace. Due to their simplicity, the four minute high and three minute wide characters serve admirably for this purpose.

For simplicity, the invention has been disclosed with particular reference to the characters in Figure 3, wherein the interspaces are of the same width as the body portions; and it will be readily apparent that the principle of the invention is equally applicable to characters wherein the width of the interspace is different from the width of the body portions; as for instance, the characters in Figure 4, wherein each interspace is twice the width of the body portions.

Obviously, the diagrams in Figure 1 may be altered so that the interspaces are twice the width of the blocked solid areas, whereupon such diagrams may be employed in the previously described manner, to construct all of the characters in Figure 3 so that the detail dimensions thereof will be equal to the detail of the characters in Figure 4. As previously explained, characters having the detail dimensions illustrated in Figure 4, have a greater visibility than is required by the normal eye. However, normal vision is not limited to objects having a width subtending an angle of one minute, provided that the length thereof is adequate; and therefore, characters constructed as in Figure 4 are reducible to normal visibility. As previously explained, where detail dimensions are uniform, visibility is uniform; and it will be readily understood that characters constructed as in Figure 4 may be reduced to a size where they will present a uniform visibility equivalent to normal visual acuity.

It will also be readily understood that the principle of the invention may be employed to construct letters and numerals of any size and having any uniform ratio between the width of the interspaces and the width of the body portions, and that in every instance the length of the completely enclosed interspace will exceed its width by an amount equal to the width of the body portion and that there will be uniform dimensions of like parts in the several characters, and consequently a uniform visibility.

Various characters, other than letters and numerals, may be constructed in accordance with the principle of the invention and such characters may be either a simple unit, or various composite multiples of different units, and the characters may occupy areas of various shapes and sizes. The invention assures uniform dimensions of the detail parts of the characters, and visibility will be uniform irrespective of any variations in the shape and size of the area occupied by different characters.

Having thus fully described my invention, what I claim as new and desire to secure by Letters Patent is:—

1. A series of visual acuity characters in which the width of each interspace and the width of each part of the body of each character subtends an angle of one minute at a designated distance, the maximum length interspaces and maximum projections having a length subtending an angle of three minutes at said designated distance, the minimum length interspaces and minimum projections having a length subtending an angle of two minutes, at said designated distance; each minimum interspace being completely surrounded by the body of the character and each maximum interspace extending to the edge of the character leaving an open end; the several characters having a uniform visibility.

2. A series of visual acuity characters each subtending an angle of four minutes in width and five minutes in height at a designated distance and having two horizontal interspaces separated by a central bar, the width of each interspace and the width of each part of the body of each character subtending an angle of one minute at said designated distance, the maximum length interspaces and maximum projections having a length subtending an angle of three minutes at said designated distance, the minimum length interspaces and minimum projections having a length subtending an angle of two minutes at said designated distance; each minimum interspace being completely surrounded by the body of the character, and each maximum interspace extending to the edge of the character leaving an open end; the several characters having a uniform visibility.

3. A series of visual acuity characters each subtending an angle of three minutes in width and four minutes in height at a designated distance and each having a single vertical interspace, the width of each interspace and the width of each part of the body of each character subtending an angle of one minute at said designated distance, the maximum length interspaces and maximum projections having a length subtending an angle of three minutes at said designated distance, the minimum length interspaces and minimum projections having a length subtending an angle of two minutes at said designated distance; each minimum interspace being completely surrounded by the body of the character, and each maximum interspace extending to the edge of the character leaving an open end; the several characters having a uniform visibility.

4. A series of visual acuity characters, wherein each interspace completely enclosed by the body of the character is of a length equal to the width of said interspace plus the width of the body portion of said character; the width of interspace being equal in the several characters and the width of body being equal in the several characters; and wherein, each interspace having an open end is of the same width as said enclosed interspace and of a length exceeding the length of said enclosed interspace by an amount equal to the width of the body portion of said character; and wherein the shortest projecting part equals the length of said enclosed interspace; and wherein the longest projecting part equals the length of said open interspace.

5. The method of constructing visual acuity characters, whereby related characters have equal dimensions of detail parts, irrespective of the size of the area occupied by each character, said method comprising; First, segregating known characters into two distinct classes, one of said classes comprising characters having two interspaces separated by a central bar, the other of said classes comprising characters having a single interspace; second, constructing a geometrical design comprising four concentric circles, the innermost circle having a diameter equal to the desired width of each of the aforementioned interspaces, the second circle having a radius exceeding the radius of the innermost circle by an amount equal to the desired width of projections and intersecting parts constituting each of the characters to be constructed, the third circle having a radius exceeding the radius of the second circle by an amount equal to the diameter of the innermost circle, the fourth circle having a radius greater than the radius of the third circle by an amount equal to the difference between the radius of the second circle and the radius of the innermost circle; constructing the common diameter to the four circles aforesaid, constructing two tangents to said second circle, each of said tangents being parallel to the aforementioned diameter, one of said tangents extending from said second circle in one direction and the other extending in the opposite direction and each of said tangents intersecting the aforementioned third and fourth circles; the area between said third and fourth circles being blocked solid between the common diameter aforementioned and the aforementioned tangent nearest thereto, and the entire area between the innermost circle and the second circle being also blocked solid, then separating said geometrical design into its two halves formed by the aforementioned diameter, and interposing three spaced squares therebetween, said squares being interposed adjacent to the aforementioned blocked solid areas and equal thereto in width; third, constructing a second geometrical design comprising the letter E, the width of the projections and intersecting parts of said latter geometrical design being the same as the width of the areas blocked in the former design, the upper and lower projections thereof, having a length equal to the diameter of said second circle in the former geometrical design and the central projection being of a length equal to the radius of said innermost circle plus the radius of said second circle; and the spacing of said projections being equal to the diameter of said innermost circle; fourth, uniting segments of the former concentric design, with sections of the latter design, in that manner whereby the length of each interspace when completely surrounded by the body of the character will be equal to the radius of said innermost circle plus the radius of said second circle, no matter what the length of each radius may be, and whereby when said interspace is extended to the edge of the character thereby leaving an open end, the length of said open interspace will be equal to the diameter of said second circle, no matter what the diameter of said second circle may be; fifth, uniting the straight projections and intersections comprising said latter design, in that manner whereby the width of each interspace will be equal to the diameter of the innermost circle of said former design and whereby the length of each maximum projection will be equal to the diameter of said second circle and whereby the length of each minimum projection will be equal to the radius of said innermost circle plus the radius of said second circle; whereby the several characters formed by the described method, will have uniform dimensions of detail parts irrespective of the dimensions of the area occupied by each character, and whereby the length of each enclosed interspace will exceed the width thereof by an amount equal to the width of the body portion of such character, and whereby the variation between the maximum and minimum length of projecting parts and of interspaces of such characters will be equal to the width of the body portion of each character.

6. A series of visual acuity characters, wherein each interspace is of the same width as the projections and intersecting parts which constitute the body of each character, and wherein the length of each completely enclosed interspace exceeds the width thereof by an amount equal to said width, and wherein the minimum length of projecting parts is equal to the length of said enclosed interspace, and wherein each maximum projection exceeds the length of said enclosed interspace by an amount equal to the width thereof, and wherein each interspace having the same length as said maximum projection has an end open to the edge of the character.

7. A series of visual acuity characters, wherein the body portions comprising projections and intersecting parts are equal in width in the several characters, and wherein the interspaces of the several characters are equal in width, and wherein each interspace completely enclosed by the body part of such character, is of a length equal to the combined width of said interspace and said body part, and wherein each minimum projection has the same length as said enclosed interspace, and wherein each maximum projection exceeds the length of said enclosed interspace by an amount equal to the width of said projection, and wherein each interspace having the same length as said maximum projection has an end open to the edge of the character.

8. A series of visual acuity characters, wherein the body portions comprising projections and intersecting parts are equal in width in the several characters, and wherein the interspaces of the several characters are of the same width as said projections and intersecting parts, and wherein the length of each minimum projection exceeds the width thereof by an amount equal to the width thereof, and wherein the length of each maximum projection exceeds the length of said minimum projection by an amount equal to the width thereof, and wherein each interspace completely enclosed by the body of the character has the same length as said minimum projection, and wherein each interspace having the same length as said maximum projection has an end open to the edge of the character.

9. A series of visual acuity characters, wherein the body portions comprising projections and intersecting parts are equal in width in the several characters, and wherein the interspaces of the several characters are equal in width, and wherein the length of each minimum projection exceeds the width thereof by an amount equal to the width of the aforementioned interspace, and wherein the length of each maximum projection exceeds the length of said minimum projection by an amount equal to the width of said projection, and wherein each interspace completely enclosed by the body of the character has the same length as said minimum projection and wherein each interspace having the same length as said maximum projection has an end open to the edge of the character.

10. A series of visual acuity characters wherein the longest projection subtends an angle of three minutes and the shortest projection subtends an angle of two minutes at that distance at which the width of all projections and all interspaces subtends an angle of one minute, and wherein each interspace completely surrounded by the body of the character has the same length as said shortest projection, and wherein each interspace having the same length as said maximum projection has an end open to the edge of the character; the several characters having a uniform visibility.

ORVAL W. LEE.